Nov. 4, 1958 S. R. STILES 2,859,260
ALKYLATION OF HYDROCARBONS
Filed May 31, 1955
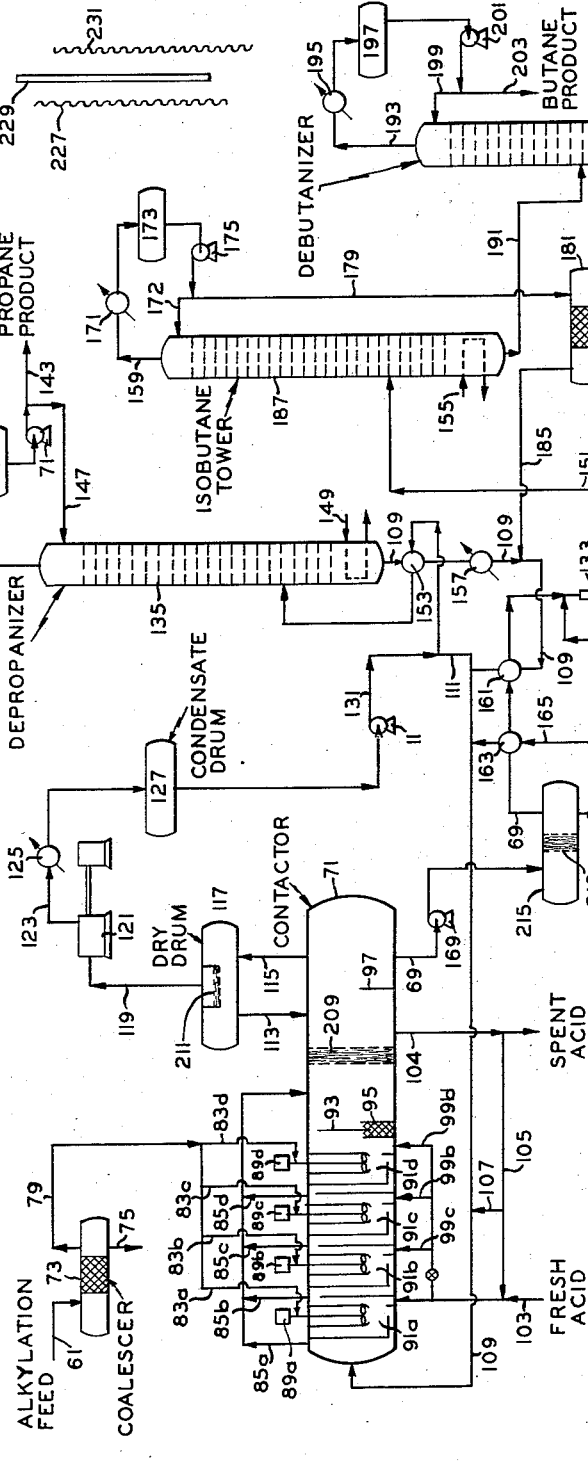
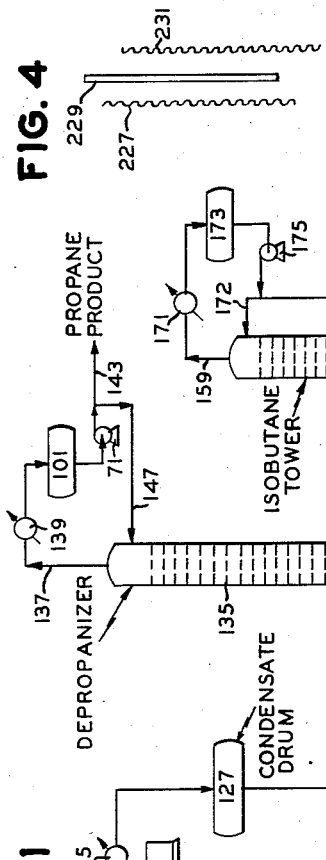
*INVENTOR.*
SAMUEL R. STILES
BY
*L. H. Palmer*
ATTORNEYS

United States Patent Office 2,859,260
Patented Nov. 4, 1958

2,859,260

ALKYLATION OF HYDROCARBONS

Samuel R. Stiles, Cresskill, N. J., assignor to The M. W. Kellogg Company, Jersey City, N. J., a corporation of Delaware Application May 31, 1955, Serial No. 511,988

11 Claims. (Cl. 260—683.62)

This invention relates to an alkylation process and, more particularly, to the alkylation of isoparaffins with olefins in the presence of a liquid catalyst to produce hydrocarbon compounds boiling in the gasoline range. Still more particularly, it relates to method and apparatus for decreasing acid and/or catalyst ester entrainment in an alkylation process.

In the alkylation of hydrocarbons with olefins in the presence of a liquid catalyst, the problem is presented of separating the catalyst and other contaminants from the hydrocarbon reaction product. Of particular interest are the alkylation processes which involve the use of an acid or other corrosive catalyst. Typical is the alkylation of isobutane with butylene in the presence of sulfuric acid which may be illustrated, according to one school of thought, by the following reactions:

$$H_2SO_4 + C_4H_8 \longrightarrow (C_4H_9)HSO_4$$
Acid    Butylene              Acid Ester $$(C_4H_9)HSO_4 + C_4H_{10} \longrightarrow C_8H_{18} + H_2SO_4$$
Acid Ester    Isobutane       Iso-octane  Acid As shown, sulfuric acid catalyst reacts with butylene to form butyl acid sulfate, which in turn reacts with isobutane to form issooctane, with the sulfuric acid molecule being released for further catalytic action. In the alkylation reaction, the majority of contacts between the acid, isoparaffin and olefin are followed by the illustrated condensation reaction; however, in some cases the acid ester molecule does not come in contact with an isoparaffin molecule and acid esters leave the reaction zone in the product mixture.

In addition to the above reactions, acid esters may react with olefins to form polymers and free acid or to form neutral esters, as illustrated by the following reactions:

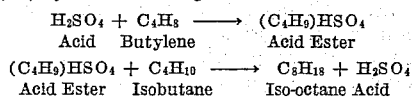

$$(C_4H_9)HSO_4 + C_4H_8 \longrightarrow (C_4H_9)_2SO_4$$
Acid Ester    Butylene       Neutral Ester The failure of acid esters to react to form alkylate and the formation instead of olefin polymers and neutral esters results from the fact that the acid ester molecules do not contact isoparaffin molecules. Another factor which influences the production of these undesirable side-products is the high reactivity of olefins in the presence of sulfuric acid, particularly at higher temperatures. A partial control of the production of polymers and esters, both those illustrated and others of more complex molecular structure and higher molecular weight, is provided by carrying out the alkylation reaction in such a manner that a large excess of isoparaffin is always present in the reaction zone. In addition, reaction conditions of temperature, pressure, acid concentration, etc., when closely controlled, also tend to promote the alkylation reaction and diminished side reactions. In spite of these precautions, however, acid and neutral esters and polymers are present in the effluent from the alkylation reaction zone.

In the conventional alkylation process, including the illustrated example, good contact between the reactants is provided by conducting the reaction in a zone of high turbulence. More usually, the reaction is carried out by introducing the olefin reactant into an emulsion of hydrocarbon and catalyst. Although this method of operation provides good conversion and an alkylate of high quality, it also introduces the problem of separating the hydrocarbon-catalyst emulsion into alkylate product and catalyst after the alkylation reaction is completed. For this purpose, it is customary to provide a settling zone following the alkylation reaction zone wherein the mixture is allowed to separate into the desired phases. The degree of separation obtained in this zone is dependent on a number of factors, including the stability of the emulsion, the viscosity of the catalyst and hydrocarbon phases, and the settling time provided therein. Ordinarily, separation is incomplete and each phase leaving the alkylation reactor is contaminated with material which would normally be retained in the other phase. The phase of interest here is the hydrocarbon, and the contaminants retained therein comprise primarily unseparated catalyst and catalyst esters.

The presence of alkylation catalyst and catalyst esters in hydrocarbons leaving the alkylation reactor presents a number of disadvantages. In the conventional alkylation process it is customary to recycle at least a portion of the contaminated catalyst phase from the settling zone to the alkylation contactor. A loss of catalyst in the hydrocarbon effluent from the reactor means a reduction in this stream, and consequently, an increase in the amount of fresh catalyst which must be introduced into the contactor. The presence of esters in the hydrocarbon effluent also presents difficulties. In the usual alkylation process, it has been the practice to treat the reactor effluent with a neutralizing material, for example, caustic to remove esters and entrained catalyst. The treated hydrocarbon mixture is then further processed to separate unreacted feed and low-boiling hydrocarbons from the alkylate product. More usually, however, the caustic treatment is only partially successful and the contaminants which are not removed pass into the alkylation recovery system. The result is numerous instances of catalyst corrosion and of fouling, due to partial saponified esters. It has also been found that many of the esters are unstable to heat and decompose at elevated temperatures with the release of sulfur dioxide or sulfur trioxide and the formation of heavy polymer type materials. This introduces additional fouling in high temperature towers and reboilers.

The detrimental effects of catalyst and ester carry-over are not limited to the alkylation liquid recovery system. This problem may also exist in the handling of vapors leaving the reaction zone. Typical, again, is the alkylation of isobutane with butylene. This reaction is preferably carried out at low temperatures and pressures, primarily to inhibit the formation of undesirable side-products. The problem of removing sensible and reaction heat from the alkylation system is usually solved by the use of refrigeration, which involves the vaporization and removal of a large quantity of hydrocarbons from the alkylation reaction zone. The refrigeration gases normally contain entrained liquid in the form of droplets, including both acid catalyst and acid and neutral esters. Under the conditions which exist in the conventional alkylation gas refrigeration and compression system, ester decomposition is promoted with the undesirable results previously noted. Also, sulfur dioxide evolved in the decomposition, in combination with entrained acid, may provide a corrosive condition in the compressor and in the fractionation equipment associated therewith.

It is an object of this invention to provide improved process and apparatus for the alkylation of hydrocarbons in the presence of a liquid catalyst.

It is another object of this invention to improve the separation of hydrocarbon and catalyst phases in a process for the alkylation of hydrocarbons in the presence of a liquid catalyst.

Still another object of this invention is to decrease the consumption of catalyst in the alkylation of hydrocarbons.

Yet another object of this invention is to reduce corrosion and fouling in alkylation recovery and compressor equipment.

Still another object of this invention is to provide improved process and apparatus for the alkylation of isoparaffins with olefins in the presence of sulfuric acid.

These and other objects of the invention will become more apparent from the following detailed description and discussion.

In the method of this invention, the aforementioned objects are broadly achieved by passing gases and liquid effluent from an alkylation reaction zone through wire coalescer mats effective to remove, by contact, entrained liquid droplets.

This invention is applicable to alkylation processes generally, including the alkylation of paraffins, isoparaffin, aromatic compounds, cyclicaliphatic compounds, alcohols, etc., with olefinic hydrocarbons. The alkylation reaction takes place over a range of temperature and pressure varying from as low as −50° F. to as high as about 600° F. when certain aromatic compounds are reacted with olefins. It may be conveniently carried out under pressures at or below atmospheric or as high as several hundred atmospheres. To establish conditions favorable for the production of high octane alkylate in large yields, it is desirable to contact the reactants under conditions of violent agitation, yet provide uniform mixing, and to maintain at the contact point a high concentration of alkylatable hydrocarbon to olefin.

A wide variety of catalysts are available for use in the alkylation of an alkylatable compound with an olefin, or, more specifically, an isoparaffin with an olefin. Those frequently employed include acids, such as sulfuric, hydrofluoric, phosphoric, chlorosulfonic, fluorosulfonic, etc., which may be used either singly or in mixtures. Nonsolid Friedel-Crafts catalysts which form a liquid phase substantially immiscible with the hydrocarbon phase may be used. They include the conventional Friedel-Crafts metallic halides in acid such as those just enumerated and metallic halide-hydrocarbon complexes. Other liquid catalysts which provide a heterogeneous reaction mixture with hydrocarbons may also be used within the scope of this invention.

Although the invention finds wide application, it is particularly of interest in the alkylation of low-boiling isoparaffins with olefins in the presence of sulfuric acid. This reaction is usually carried out at temperatures between about 0° F. and about 150° F. and is preferably conducted in several stages. The pressure in the reaction zone is maintained at a level sufficient to keep the reactants in a liquid state, usually between about atmospheric and about 100 p. s. i. g. In order to obtain a high quality product, it is desirable to maintain a high isoparaffin to olefin ratio in the feed to the reaction zone, preferably between about 2 and about 20 mols per mol, and it is necessary to keep the acid catalyst strength above about 80% and preferably above about 90%. A preferred method of providing the desired reactant ratio is to conduct the process in several reaction stages with series flow of the isoparaffin and catalyst through each stage and parallel flow of olefin to each stage. The time required to carry out the alkylation reaction varies with the operation conditions; however, in general, a reaction time between about 2 minutes and about 200 minutes suffices. The alkylation process is preferably conducted in the liquid phase and under conditions of agitation whereby good contact is obtained between the hydrocarbon reactants in one phase and the alkylation catalyst in the other liquid phase.

Feed stocks used in the alkylation process may vary widely in composition and may contain a large variety of saturated and unsaturated compounds. A primary source of feed materials for this reaction exists in refinery process gases which may contain paraffins having from 1 to 6 carbon atoms, isoparaffins including isobutane, isopentane and others of higher molecular weight, and numerous low-boiling olefins and their isomers, for example, propylene, butylene, isobutylene, etc. It is within the scope of this invention to use feed stocks containing these and higher boiling comopnuds in widely varying proportions.

The alkylation of an aromatic or a cycloaliphatic compound with an olefinic compound results in the production of compounds which may be useful in themselves, but which generally are more useful as intermediates in the manufacture of other chemical compounds. Examples of aromatic and cycloaliphatic alkylation reactions include the reaction of benzenes, naphthalenes, phenols, etc., and their homologues with olefins in the presence of mixed catalysts, for example, hydrofluoric acid-boron trifluoride or liquid complexes of aluminum chloride with acids and/or hydrocarbons. In general, these reactions are carried out between about 30 and about 120° F. under atmospheric or superatmospheric pressures, as required to maintain the reactants in a liquid state. Other typical reactions are benzene with propylene in the presence of liquid phosphoric cid, benzenes with isoparaffins in the presence of olefins, and an acid such as sulfuric or hydrofluoric, isoparaffins with alkyl substituted cyclopentanes in the presence of an acid such as sulfuric or hydrofluoric, etc. The reaction conditions used in these and similar reactions involve temperatures and pressure comparable to those illustrated. Normally, the alkylatable compounds are present in greater quantity than the olefinic reactant, and the relative concentrations of catalyst and hydrocarbon reactants, in general, conform to those required for the alkylation of isoparaffins. The pressures may vary from subatmospheric to several atmospheres, depending on the particular reactants, and the reaction time required varies from as low as a few minutes to several hours.

The olefinic reactants used in alkylating acyclic, cycloaliphatic and aromatic compounds are usually the low-boiling olefins previously mentioned; however, other more complex olefinic compounds well known to those in the art, which are capable of entering into the alkylation reactions, are also included within the scope of this invention.

In a typical application of the invention, isobutane and sulfuric acid are introduced into an alkylation reaction zone and are violently agitated to form an emulsion, this being the preferred method of assuring intimate contact between the acid catalyst and the hydrocarbon to be alkylated. The major portion of the isobutane feed is provided by a recycle stream obtained from subsequent distillation steps. Any additional quantity of isobutane required, for example, that amount needed to start up the unit, is usually supplied from an independent source. The mixing and agitation required in the alkylation contact zone may be provided in a number of ways; however, usually a conventional mixer, or pump, provides a means for creating and moving the emulsion at high velocity and also for circulating the emulsion in the contact zone. The reaction may be carried out in one stage, although more usually several stages in series are provided with a portion of the olefin reactant being admitted to each stage and contacting isobutane passing serially through the successive stages. The alkylation feed, which contains the olefin reactant, also contains isobutane, butane, propane, isopentane, pentane, and frequently small quantities of lighter paraffins. The temperature in the reaction zone is maintained at a constant low level by vaporizing therefrom the lighter components in the reaction products, more usually, a mixture of butane, isobutane, propane and any lower boiling compounds. The vapors are compressed and condensed and the condensate, after the removal of propane and lighter components, is returned to the alkylation reaction zone in the isobutane recycle.

Effluent from the last contactor reaction section is passed to a separation zone wherein the emulsion is allowed to separate into two phases, one predominately acid in content, and the other comprising primarily hydrocarbons. To aid in the separation, a wire coalescer mat is provided in this zone. This mat is formed of material which is selectively wetted by catalyst and catalyst esters. The extent of the mat preferably is such that it covers substantially the entire cross-section of the settling zone, so that all of the vapors and liquid leaving the contactor are forced to pass through the mat. Contaminated acid containing esters and hydrocarbon polymers is removed from the contactor, with a portion being recycled to the reaction sections and the remainder either being processed to remove contaminants, being used in a treating process wherein a high degree of acid purity is not required or being discarded. The material in the hydrocarbon phase comprises a mixture of alkylate, unreacted isoparaffin, normal paraffins and acid and ester contaminants. If the concentration of the latter materials, namely, the contaminants, is not sufficiently reduced by passage through the wire coalescer, a caustic wash may be utilized before passing the hydrocarbon effluent to the alkylate recovery system.

The gases which are formed in the contactor also pass through the coalescer mat contained within this vessel. Due to the low velocity therein, however, an adequate removal of entrained liquid may not be attained and it may be desirable to provide a supplementary coalescer. A convenient location for an auxiliary coalescer, if one is desired, is in the receiver or dry drum through which the vapors pass prior to their introduction into the suction of the refrigeration compressor.

The liquid droplets which are removed by the various coalescers will vary in size. The primary purpose of the coalescers is to remove droplets which are sufficiently small in size to be unaffected by Stokes Law at the flowing conditions; that is, droplets having a substantially zero settling rate under the conditions operating in the system. These droplets usually range in size from about 0.01 micron to about 5 microns. Since the settling time normally provided following the alkylation reaction is of rather short duration, larger droplets which would settle under conditions of extended time may also be entrained. These may range in size up to about 10 microns or larger. The removal of these droplets is also contemplated within the scope of the invention.

In their preferred construction, the coalescer mats are formed of wires arranged so as to present a large surface for impingement of flowing droplets. The wires used may vary in size, ranging from about 0.001 inch in diameter to as large as about 0.1 inch in diameter. If desired, more than one size of wire may be used in an individual mat, although, more usually, all the wires are of a single size. Since pressure is an important factor in the alkylation process, the wires are preferably arranged to present a minimum obstruction to flow. More usually, the spacing of the wires and the wire size are proportioned to provide a minimum pressure drop. For example, when coalescing in a mat having a thickness or depth between about 4 and about 6 inches and a liquid throughput of between about 0.1 and about 0.4 cubic feet per second per square foot of mat surface, the pressure drop therethrough is between about 0.1 and about 0.5 p. s. i. g. In one embodiment of the invention, maximum contact surface with a minimum of pressure drop is obtained by arranging the wire in the coalescer in the form of screens of rather wide mesh with successive screens being sufficiently displaced laterally to provide a minimum of open area in the longitudinal direction of flow and at the same time displaced sufficiently longitudinally to present a minimum obstruction to lateral flow. In such a mat, each particle of the liquid has a large angular component of flow relative to its linear movement, and thus follows a winding course through the mat.

The thickness of the mat varies with the service and degree of the droplet removal desired; more usually, in commercial operations the coalescing material comprises between about 40 and about 200 wire screens and has an overall thickness of between about 4 and about 6 inches, thus providing good contact by depth. If the effective surface of the mat is considered as equal to one-half of the total wire surface, then for each inch of depth the coalescer usually furnishes a contact surface area of between about 0.5 and about 20 square inches per square foot of mat surface, thereby providing a surface to volume ratio of between about 6 and about 240 to 1. The mats may be manufactured in any suitable shape for satisfactory installation in processing equipment. For example, in some instances it may be desirable to use a mat in the form of a roll for installation in a cylindrical vessel, whereas in other cases a square shaped mat or one of irregular shape may be desirable. As stated previously, coalescer mats are preferably constructed with a wire of one size for each individual mat; however, in some cases it may be desirable to form a coalescer of a number of successive mats, each providing different flow characteristics therethrough, namely, by the use of wires of different size.

The material from which the mat is constructed comprises various materials, which, as mentioned before, are selectively wetted in the alkylation system by the alkylation catalyst and esters thereof. These materials include stainless steels, plastics, such as, for example, polytrifluorochloroethylene and polyethylene, glass cloth, glass wool, etc. In addition to the wetting ability required, it is also desirable that the materials used be relatively non-corrosive in the alkylation system and have a sufficient degree of strength to withstand normal operating stresses. For the latter reason, more usually it is preferred to use a metal selected from the group given.

A number of interesting phenomena have been noted in the use of coalescer mats of the type described. For example, it has been found that the superficial linear velocity of the fluid flowing through the mat has a considerable effect on the size of the liquid particles coalesced, with droplets of decreasing size being removed as the velocity through the mat is increased. For example, at low liquid velocities, that is, velocities ranging from between about 0.2 and about 0.5 foot per second, the larger droplets, down to those of about 2 microns in sizing, are effectively removed. At higher velocities, up to about 0.7 foot per second, the smaller droplets, including those of about 0.5 micron, are preferentially removed. Similar results obtain in the separation of liquid droplets from a vapor medium. In the case of a vapor system, however, the corresponding vapor velocities range from between about 5 and about 10 feet per second to remove larger droplets, and up to about 15 feet per second to remove droplets of about 0.5 micron in size. Because of the aforedescribed velocity effect, it has been found advantageous, where emulsion passes first through a low velocity section and then a higher velocity section, to install a coalescing mat in each section. Inasmuch as removal of entrained particles is not 100% effective in any coalescer, it is apparent that this type of installation has a definite advantage.

At superficial velocities, higher than those given, the degree of entrained liquid removal usually decreases, presumably due to splitting up of at least a portion of the entrained liquid droplets into very small droplets which successfully pass through the coalescer mat. As the velocity is increased still further, the coalescing becomes poorer until eventually substantially no droplets are removed. This situation usually obtains at a velocity between about 0.6 and about 0.8 foot per second in a liquid system and at between about 13 and about 17 feet per second in a vapor system. It has been found unexpectedly, however, that if a mat operating within the satisfactory coalescing range namely, between about 0.2 and about 0.7 foot per second or between about 5 and about 16 feet per second, in liquid and vapor systems respectively, is installed after such a high velocity mat, the total removal of entrained liquid particles is substantially increased. The reason for this phenomena is not clearly understood. According to one theory, some of the smaller droplets, which would not normally be removable at coalescing velocities, combine or coalesce with other droplets during their passage through the high velocity mat. This, in effect, increases the percentage of removable droplets which can then be taken out in a subsequent mat operating within the coalescing velocity range. As used subsequently herein, the term "high velocity" is considered to include generally velocities above the critical coalescing velocity. As used herein, the term "critical coalescing velocity" is considered to be the velocity above which coalescing decreases rather than increases, that is, the upper limit of the coalescing velocity range.

Advantage is taken of the aforedescribed phenomena in the installation of coalescing mats in the vapor space of the reactor settling zone and in the refrigeration dry drum. The vapor velocity in the reactor settling zone is relatively low, usually between about 1 and about 4 feet per second, whereas the dry drum, being of smaller cross-section, has a substantially higher vapor velocity, usually between about 3 and about 6 feet per second. Similar mats installed in each location thus provide complementary removal of substantially different size particles in each zone.

As an alternative to the two mat vapor system described, it may be desirable to use three mats, namely, by the addition of a high velocity mat preceding the coalescing mat in the dry drum. More usually, in an installation comprising a high velocity mat followed by one operating within the effective coalescing velocity range, it is desirable to maintain a velocity through the first mat above about 20 feet per second and not less than about 15 feet per second. It should be clearly understood that the use of two or more mats having different fluid velocities therethrough does not provide a result which is merely cumulative in nature. Thus, the use of systems as described provides substantially greater droplet removal than would be obtained by installing successive mats in a zone of constant velocity, namely, in the settling zone or in the dry drum respectively.

More than one method of attaining variations in velocity through the mats is available. For example, if mats of identical construction are used, it is possible to vary the velocity therethrough by varying the cross-sectional area of the mat exposed to flow. On the other hand, a similar effect may be obtained by the use of successive mats having a different permeability to flow. This may, of course, be obtained by varying the wire size, the mesh of each individual screen forming the mat and/or the longitudinal or horizontal displacement of the screens within the mat. A particularly effective method of coalescing is provided by the use of a series of layers or beds of coalescing material offering different restrictions to flow.

In order to more clearly illustrate the invention and provide a better understanding thereof, reference is had to the accompanying drawings of which:

Figure 1 is a diagrammatic illustration of an alkylation unit and Figures 2, 3, 4 and 5 show various construction features of typical coalescing mats.

Referring to Figure 1, the alkylation reactions are carried out in a cylindrical elongated contacting vessel 71. The interior of approximately one-half of the contactor is divided into a number of separate reaction stages or sections 91a, b, c and d by transverse baffles so arranged that liquid entering the end of the contactor passes from an inlet chamber 91 upward through the first section 91a, over a baffle down to the bottom of the second 91b, then upward through the second section over a second baffle and in a similar manner through the third and fourth sections 91c and d. Each section contains a mixer 89a, b, c and d, respectively, in this specific illustration, centrifugal submersible pumps disposed vertically with the drivers located outside and above the contactor and the impellers located in the lower portion of each reaction section. Each pump is so constructed that material entering the suction is forced upward within the pump casing and then downward and out through perforations in the casing into the upper part of the corresponding reaction section. The pump capacities are such that the quantity of material circulated through each pump is about twenty times greater than the total liquid flow entering the section within which the pump is located.

The alkylation reactants and catalyst enter the contactor 71 at three different points. The treated alkylation feed, comprising a mixture of propane, butane, isobutane and butylene is passed through conduit 61 into vessel 73 containing excelsior or a similar material for the removal of undissolved water. The water is removed from the coalescer through conduit 75 and the alkylation feed passes overhead through conduit 97 and enters pumps 89a, b, c and d through conduits 83a, b, c and d respectively, passes downward through a hollow sleeve surrounding each pump shaft and is admitted to the liquid stream flowing through each pump, downstream of the pump impellers. A mixture of propane, butane and isobutane made up of a recycle stream from the isobutane tower 187, fresh isobutane from conduit 165 and compressor effluent from condensate drums 127 are admitted to the inlet chamber 91 of the contactor. The acid catalyst, comprising a mixture of fresh acid and contaminated acid in an amount to provide an external acid to olefin ratio of about 4 pounds of acid per pound of olefin, is admitted to the bottom of the first reaction section 91a through conduit 103. As illustrated, fresh acid alone may be used rather than a mixture of fresh and contaminated acid and acid may be introduced not only into the bottom of the first section but may also be admitted to succeeding sections. The isobutane passes from the inlet chamber 91 also into the first section 91a, is combined with the acid, and the mixture enters the suction of pump 89a where it is picked up, emulsified, and directed within the pump casing at a high velocity. The alkylation feed from conduit 83a is admitted to the emulsion downstream of the pump impeller and the alkylation reaction proceeds immediately and is substantially completed before the reactants leave the pump casing. The capacity of pump 89a and the other pumps is sufficiently great to assure a circulation rate several times as great as the flow of alkylation feed, isobutane and acid into section 91a. Thus, unreacted isobutane is recirculated along with the acid catalyst and a portion of the alkylation product through the pump a number of times before it passes into the next section where another portion is reacted with fresh alkylation feed. The same procedure is repeated in sections 91c and d. By this method of contacting the reactants and catalyst, it is possible to provide an internal ratio of isobutane to butylenes of about 400 to 1 with an external ratio of only about 20 to 1.

The mixture of isobutane alkylate and acid leaving the last section pass through a packed zone 95 formed by parallel transverse baffles and containing a conventional inert packing material, such as, for example, Berl saddles or Raschig rings. All of the effluent from the last section is forced to flow through this zone by a deflector baffle 93 extending above the liquid level in the contactor and downward within the packed zone. Subsequent to the packed zone, the acid enters a settling zone contained within baffles 95 and 97 wherein settling time is provided for the separation of the acid and hydrocarbon phases. Alkylate which accumulates along with other hydrocarbons in the upper phase overflows baffles 97 and is removed from the settling zone through conduit 69. Contaminated acid from the lower phase containing polymers and other impurities passes through the contactor 71 through conduit 104. A portion of this acid is recycled to the contactor or through conduit 105 or with recycle isobutane through conduit 107. The remainder of the acid is discarded or is reconcentrated for use again in the alkylation reaction.

Disposed within the contactor settling zone is a coalescing mat 209 arranged so as to provide for flow therethrough of all the liquid and vapor entering the settling zone. This mat, which is about 6 inches in thickness, consists of knitted stainless steel wire having a diameter of about 0.011 inch. The mat, which is made up of double thicknesses of wire and screen crimped in alternate directions in double layers, is constructed in a manner similar to that illustrated in Figures 4 and 5. To provide for support of the mat, steel gratings, which are fastened to the inner shell of the settling zone, are placed before and after the mat and attached thereto. The velocity of both the liquid and vapor through the settling zone is low, namely, about 0.02 feet per second and about 1 foot per second respectively. At this velocity, the aforedescribed mat provides sufficient coalescing effect to remove a large portion of entrained acid and ester droplets which would normally remain in the hydrocarbon liquid and vapor phases. The size of the droplets removed varies from the largest of those entrained down to a size of about 10 microns in the liquid and about 4 microns in the vapor.

The alkylation contactor 71 is maintained at a temperature of about 35° F. and at a pressure of about 3.5 p. s. i. g. The alkylation reaction is highly exothermic and it is necessary to provide a method of cooling the contactor to remove the heat of reaction and the sensible heat in the feed streams and thereby maintain the reaction sections at this low temperature. In this specific illustration, the cooling is accomplished by auto-refrigeration of the reactants and reaction products. In carrying out this process, vapors are withdrawn from the contactor through conduit 115 into a dry drum 117.

A second coalescing mat 211, similar to the one just described, is placed in the dry drum in such a manner as to provide passage of all of the contactor vapors therethrough. This mat is installed in a slightly different manner whereby the cross-section of flow therethrough is readily set to provide the desired vapor velocity. In this particular illustration, the mat is sized to provide a vapor velocity therethrough of about 6 feet per second. As a result of the increased velocity, smaller droplets which passed through the first coalescer are removed, thereby substantially completing the removal of entrained liquid down to and including droplets of about 1 micron in size.

Any materials settling in the dry drum, including coalesced liquid, are returned to the contactor settling zone beneath the acid level through conduit 113. The dry gas enters the suction of compressor 121 through conduit 119, is compressed, discharged through conduit 123, condensed in a conventional water cooler 125 and passed to a condensate drum 127. The condensate comprises a mixture of propane, butane and isobutane. It is withdrawn from the condensate drum and divided into two parts, with a portion being sent to the depropanizer 135 and the remainder being returned to the contactor 71 with the fresh isobutane and isobutane recycle. It is desirable to proportion the condensed compressor effluent stream so as to maintain a controlled concentration of light materials in the contactor. By this means, it is possible to obtain the desired contactor temperature with a reasonable compressor suction pressure.

The isobutane recycle stream enters the contactor as liquid and at a higher temperature and pressure than that maintained within the contactor, i. e., about 50° F. and about 20 p. s. i. g. As a result, a portion of this stream flashes in the entrance chamber 91. To prevent a mixture of vapor and liquid from passing into the suction of pump 89a, an outlet for this gaseous material is provided through conduit 85a. A similar situation prevails in each of the reaction sections. In order to remove the reaction heat from each section, it is necessary that a further amount of light material be vaporized therein. This material is supplied primarily in the alkylation feed from conduits 83a, b, c and d, which feed is also introduced at a temperature and pressure about 50° F. and about 25 p. s. i. g., substantially higher than those maintained in the contactor. The vapor so formed is removed from the contactor through conduits 85a, b, c and d, is combined with the vapor from conduit 85a, passes into the upper portion of the contactor downstream of the last reaction section and is withdrawn from the contactor through conduit 115. By this method of operation, it is possible to maintain a relatively constant temperature throughout the contactor 71.

The condensed compressor effluent from condensate drum 127 passes through pump 11 and is discharged through conduit 131 with a portion being separated through conduit 111 and joining the isobutane recycle through conduit 109, as previously described, and the remainder passing through a heat exchanger 153 countercurrent to the depropanizer bottoms and then into the depropanizer 135. Propane is taken overhead from the depropanizer through conduit 137, condensed in a conventional condenser 139 and discharged into accumulator 101. Accumulator liquid is then passed to the pump 71, from thence a portion is sent to the depropanizer as reflux through the conduit 147 and the remainder leaves the unit through conduit 143 as propane product. Heat is supplied to the depropanizer by a conventional reboiler 149 or other conventional heat source. The bottoms comprising primarily isobutane with some butane pass from the bottom of the depropanizer through conduit 109, give up a portion of their heat in exchanger 153 to the depropanizer feed and pass through a conventional water cooler 157 where the temperature is lowered still further. The cool isobutane is exchanged still again in exchanger 161 with cold effluent from the contactor 71, then is combined with fresh isobutane from conduit 165 which is also exchanged with contactor effluent in exchanger 163 and the combined isobutane stream is admitted to the reactor as previously described.

The alkylation product and unreacted alkylation feed, after separation from the spent acid in contactor 71, are removed therefrom through conduit 69 and pump 169 and introduced into vessel 215. Within this vessel there is installed still another coalescer bed 213, in this instance comprising alternate sections of coalescing material offering substantially different restrictions to flow. In this specific illustration, the bed is made up of four 4 inch sections of wire similar to that used in coalescer 209 alternated with three 2 inch sections of glass wool. Within this coalescer, the major portion of the smaller droplets which pass through coalescer 209 are removed, being withdrawn through conduit 217. The contactor effluent is then passed through exchangers 163 and 161, absorbing heat from fresh isobutane and from recycle isobutane respectively. The warmer hydrocarbon mixture is combined with caustic discharged from pump 129 through conduit 145 to neutralize any residual contaminants still remaining therein, and the combined stream passes through a mixer 133 into a caustic settler 153. Spent caustic is removed from the settler by pump 81, a portion being recycled to the mixer 133 through conduit 101 and the remainder being discharged from the unit through conduit 141. The acid-free contactor effluent is passed through conduit 151 into the isobutane tower 187 from which isobutane is removed overhead through conduit 159, condensed in condenser 171 and collected in accumulator 173. A portion of the condensed material is returned through pump 175 and conduit 172 to the isobutane tower as reflux. The remainder is discharged through conduit 179, passes through a water coalescer 181 and is combined through conduit 185 with the depropanizer bottoms. Water separated from this stream is removed from the coalescer through conduit 183. The heat required to vaporize the isobutane in tower 187 is supplied by conventional reboiler 155. The bottoms from the isobutane tower comprising a mixture of butane and alkylate pass through conduit 191 to a debutanizer 189 also heated by a conventional reboiler 205. Butane vapor is removed overhead through conduit 193, is condensed in condenser 195 and passes into accumulator 197. Debutanizer recycle is provided from accumulator liquid discharged from pump 201 through conduit 199. The remainder of the condensed overhead is discharged through conduit 203 as butane product. The debutanizer bottoms comprising alkylate leave the debutanizer through conduit 207 for further processing and treatment (not shown).

The preceding specific embodiment of the invention has been illustrated and described in conjunction with a particular alkylation process. This is not, however, intended in any limiting sense, and other flows, apparatus arrangements and processing methods well known to those skilled in the art are also within the scope of the invention. For example, in an alkylation system wherein heat is removed from the contactor indirectly rather than by refrigeration, a dry drum coalescer would be superfluous. Although a specific coalescer arrangement is shown in the illustration, various other arrangements utilizing the concepts disclosed in the discussion of the invention may also be employed. For example, it may be desirable to omit the coalescer in the vapor space of the contactor settling zone, and make use of the alternating velocity concept in the dry drum, either by use of a coalescer containing sections of differing permeability, or by a suitable arrangement for varying the velocity through similar coalescing sections. The mat installed in the settling zone illustrated in Figure 1 is installed to cover the entire cross-section of this zone. It is within the scope of the invention, however, to restrict the mat in size to provide passage therethrough of either vapor or liquid alone. Also, since the purpose of the mat is to improve the separation of material from the hydrocarbon phases, it is not necessary that the mat extend more than slightly into the acid layer in this zone.

Figures 2, 3, 4 and 5 illustrate various construction features of typical coalescing mats.

Figure 2 illustrates part of a mat which is made up of a number of flat wire screens of identical construction. Considering screen 221 as the first screen, the following screen 223 is displaced therefrom upward and to the right about one-half of the average distance between the wires which form screen 221, that is a displacement of about one-half of the mesh size of screen 221. The next screen 225 is displaced from screen 221 downward about three-quarters of a mesh and to the left about one-half of a mesh. Relative to screen 223, this screen is displaced downward about one and one-quarter mesh and to the left about one mesh. This method of laterally displacing the screens relative to each other makes it possible to provide a mat having a very large coalescing contact surface and produce almost complete obstruction to flow in the direction perpendicular to the mat, that is, in the longitudinal direction of flow.

Since it is desirable to provide not only maximum coalescing contact surface but also maximum flow through the mat with a minimum pressure loss, the screens which make up the mat are also displaced in the longitudinal direction so as to allow lateral flow between each screen. This is shown in Figure 3. Appropriate means may be provided for separating and supporting the screens to maintain the lateral and longitudinal displacements illustrated (not shown). As stated previously, the wires used in constructing the screens which comprise the coalescing mat may vary in size between about 0.001 inch in diameter and about 0.1 inch in diameter. The factors of mesh size and lateral and longitudinal displacement between screens in a particular coalescing mat are dependent to a great extent on the size of wire used. More usually, the screen mesh varies from between about 5 wire diameters to about 50 wire diameters and the displacement, both lateral and longitudinal, between successive screens varies between about 3 wire diameters and about 30 wire diameters. In this specific illustration the wire is stainless steel having a diameter of about 0.011 inch and the mat is composed of screens having a mesh of about 10 wire diameters, with a radial and longitudinal displacement between screens of about 3 wire diameters.

Figure 4 illustrates another variation in coalescer mat construction. In this mat the wire screens are crimped and are suitably separated from each other in a longitudinal direction by radially displacing alternate screens about 90 degrees. In this manner, the matching valleys and hills are at right angles to each other and adjacent screens are in contact with each other at the point of contact of alternating valleys and hills. In order to allow maximum flow and provide a large coalescing surface with a minimum of pressure drop, the screens are, in addition, displaced laterally similar to the screens in Figure 4. In addition to separating the screens, whereby no spacing means is required, crimping also imparts mechanical strength to the mat. The mesh size and lateral and longitudinal displacement provided in a mat of this type are preferably of the same order of magnitude as those given for the mat of Figures 2 and 3.

Figure 5 presents another construction feature in which the screens which comprise the mat are made up of knitted wire. In a mat of this type, the openings in each screen are sufficiently irregular to reduce the necessity for lateral displacement between the screens, particularly when longitudinal displacement is provided by crimping the screens, as in Figure 4. It may be desirable with this type of screen, as well as with that shown in Figure 4, to crimp more than one screen together to provide screens of double, triple and greater thickness and thereby impart a higher degree of mechanical strength to the mat.

The following data is presented to illustrate a typical commercial application of the invention:

Example

Fouling troubles in the fractionation equipment at a commercial alkylation unit became quite excessive due to high production rates of low quality alkylate. Fouling resulted primarily from excessive carryover of esters in the liquid reactor effluent. The caustic and water wash equipment provided for the purpose of removing such esters was not able to cope with this condition and, as a result, a solid deposit of partially saponified esters were found on the trays in the deisobutanizer tower. This deposit was serious enough to require shutting down of the unit and cleaning the tower every 14 to 21 days.

To remedy this situation, a coalescer vessel, having an inside diameter of about 20 inches, containing two rolls of knitted wire screen was installed downstream of the alkylation contactor. Each roll of wire was about 20 inches in diameter and about 4 inches thick and was made up of stainless steel wire (0.011 inch in diameter) with double thicknesses of screen crimped in alternate directions to provide suitable longitudinal and lateral displacement between the screens. When operating to produce a yield of about 75 barrels per hour of alkylate, several quarts of a red liquid containing about 70 percent acidic material and the remainder, polymer and water, was withdrawn from the coalescer each day. Apparently all of the free acid settled in the reactor settling zone and the material passed in the reactor effluent and removed by the coalescer was heavy esters. The coalescer was operated for 5 months and, during this period, the caustic and water wash system functioned much more efficiently to remove residual esters and prevent carryover of partially saponified material.

The previous discussion relating to the use of coalescing mats has been directed primarily to the removal of acids and esters from the product of an alkylation reaction. However, the invention also includes within its scope the treatment generally of oils contaminated with acids, more usually, sulfuric acid and esters thereof. These oils may include gasoline, naphtha, kerosine, heating oils, lubricating oils, etc., which have been previously treated with sulfuric acid, or they may include reaction products, such as, for example, the product of a polymerization reaction in the presence of sulfuric acid.

Having thus described the invention by reference to a specific application thereof, it is understood that no undue limitations are to be imposed by reason thereof, but that the scope of the invention is defined by the appended claims.

I claim:

1. In a process in which an alkylatable hydrocarbon is reacted with an olefin in the presence of a catalyst the method of improving the separation of catalyst and catalyst esters from the reaction zone effluent which comprises introducing the effluent into a settling zone wherein said effluent separates into a hydrocarbon-rich phase and an acid-rich phase, passing the hydrocarbon-rich phase at a low velocity through a first wire coalescing mat whereby catalyst and catalyst ester droplets not normally separated by settling are coalesced and removed, separately withdrawing the acid and hydrocarbon phases from the settling zone, transferring the hydrocarbon phase to a second zone and passing said hydrocarbons through a second wire coalescing mat at a higher velocity whereby additional droplets of catalyst and catalyst esters are removed.

2. In a process in which an isoparaffin hydrocarbon is reacted with an olefin hydrocarbon in the presence of a sulfuric acid catalyst the method of improving the separation of catalyst and catalyst esters from the reaction zone effluent which comprises introducing the effluent into a settling zone wherein there is effected a separation of said effluent into a hydrocarbon-rich phase and an acid-rich phase, passing the hydrocarbon-rich phase at a low velocity through a first wire coalescing mat whereby catalyst and catalyst ester droplets not normally separated by settling are coalesced and removed, separately withdrawing the acid and hydrocarbon phases from the settling zone, transferring the hydrocarbon phase to a second zone and passing said hydrocarbons through a second wire coalescing mat at a higher velocity whereby additional droplets of catalyst and catalyst esters are removed.

3. In a process in which an alkylatable hydrocarbon is reacted with an olefin in the presence of an acid catalyst and in which the effluent from the reaction zone comprises both vapor and liquid the method of improving the separation of catalyst and catalyst esters from the reaction zone effluent which comprises introducing the effluent into a settling zone wherein separation between the acid and hydrocarbon takes place to form a hydrocarbon-rich phase and an acid-rich phase superposed by hydrocarbon vapor, passing the hydrocarbons at a low velocity through a wire coalescing mat wherein catalyst and catalyst ester droplets not normally separated by settling are coalesced and removed, separately withdrawing the acid phase, the hydrocarbon liquid phase and the hydrocarbon vapor from the settling zone, separately passing the two hydrocarbon streams through coalescing mats at a higher velocity whereby additional droplets of catalyst and catalyst esters are removed from each stream.

4. In a process in which an isoparaffin hydrocarbon is reacted with an olefin hydrocarbon in the presence of a sulfuric acid catalyst the method of improving the separation of catalyst and catalyst esters from the reaction zone effluent which comprises introducing the effluent into a settling zone wherein separation between the acid and hydrocarbon takes place to form a hydrocarbon-rich phase and an acid-rich phase superposed by hydrocarbon vapor, passing the hydrocarbons at a low velocity through a wire coalescing mat wherein catalyst and catalyst ester droplets not normally separated by settling are coalesced and removed, separately withdrawing the acid phase, the hydrocarbon liquid phase and the hydrocarbon vapor from the settling zone, separately passing the two hydrocarbon streams through coalescing mats at a higher velocity whereby additional droplets of catalyst and catalyst esters are removed from each stream.

5. In a process in which an alkylatable hydrocarbon is reacted with an olefin in the presence of a catalyst and the reaction zone effluent is introduced into a settling zone wherein a separation between the acid and hydrocarbon takes place, the method of improving the separation of catalyst and catalyst esters from the hydrocarbon portion of the reaction zone effluent which comprises passing the liquid reaction zone effluent while within the settling zone through a contact coalescing zone of low flow resistance at a velocity of from about 0.2 to about 0.7 feet per second, and separating said catalyst and catalyst esters from the hydrocarbon portion of said reaction zone effluent by contact coalescing by depth through contacting said effluent in said coalescing zone sequentially with a plurality of spaced non-aligned wire members of small diameter.

6. The process defined in claim 5 in which the contact of said effluent with the spaced non-aligned wire members in its flow through said contact coalescing zone is of such frequency that said effluent in traversing a contact coalescing zone of from 4 to 6 inches thick at a throughput of from 0.1 to 0.4 cubic feet per second per square foot of surface of said contact coalescing zone has its pressure reduced from about 0.1 to 0.5 p. s. i.

7. In a process in which an alkylatable hydrocarbon is reacted with an olefin in the presence of a catalyst the method of improving the separation of catalyst and catalyst esters from the reaction zone effluent which comprises passing said effluent at a low velocity, through a first coalescing zone and then passing said liquid effluent through a contact coalescing zone of low flow resistance at a velocity of from about 0.2 to about 0.7 feet per second, and separating catalyst and catalyst ester droplets not separated in said first coalescing zone by contact coalescing by depth through the contacting of said effluent sequentially with a plurality of spaced non-aligned wire members of small diameter.

8. The process as defined in claim 7 in which the contact of said effluent with the spaced, non-aligned wire members is of such frequency that said effluent in traversing a contact coalescing zone of from 4 to 6 inches thick at a throughput of from 0.1 to 0.4 cubic feet per second per square foot of surface of said contact coalescing zone has its pressure reduced from about 0.1 to about 0.5 p. s. i.

9. A coalescing device suitable for removing immiscible alkylation catalyst and catalyst esters from a hydrocarbon fluid in a flowing stream of said hydrocarbon fluid, said alkylation catalyst and said catalyst esters, which comprises a plurality of mats spaced apart and disposed transversely across the flow path of the stream, the space between said mats occupied by glass wool, each of said mats formed of a plurality of small wire diameter, large mesh wire screens longitudinally spaced apart along said flow path, the wires of said screens non-aligned, the wire of said screens of a diameter between about 0.001 and 0.1 inch, the mesh of said screens from about 5 to about 50 times the diameter of said wire, said screens spaced apart by a distance of from about 3 to about 30 times the diameter of said wire.

10. A coalescing device suitable for removing immiscible alkylation catalyst and catalyst esters from a hydrocarbon fluid in a flowing stream of said hydrocarbon fluid, said alkylation catalyst and said catalyst esters, which comprises a plurality of mats spaced apart to provide a mat thickness of from 4 to 6 inches and disposed transversely across the flow path of the stream, the space between said mats occupied by glass wool, each of said mats formed in a plurality of small wire diameter, large wire mesh screens longitudinally spaced apart along said flow path, the wires of said screens non-aligned, the wire of said screens of a diameter between about 0.001 and about 0.1 inch, the mesh of said screens from about 5 to about 50 times the diameter of said wire, said screens spaced apart by a distance of from about 3 to about 30 times the diameter of said wire.

11. A coalescing device suitable for removing immiscible alkylation catalyst and catalyst esters from a hydrocarbon fluid in a flowing stream of said hydrocarbon fluid, said alkylation catalyst and said catalyst esters, which comprises a plurality of mats spaced apart and disposed transversely across the flow path of the stream, the space between said mats occupied by glass wool, each of said mats formed of a plurality of small wire diameter, large mesh wire screens longitudinally spaced along said flow path, the wires of said screens non-aligned, the wire of said screens of a diameter between about 0.001 and about 0.1 inch, the mesh of said screens from about 5 to about 50 times the diameter of said wire, said screens spaced apart by a distance of from about 3 to about 30 times the diameter of said wire and said screens so spaced to provide liquid throughputs of from 0.1 to 0.4 cubic feet per second per square foot of mat surface, the pressure drop across said mat ranging from about 0.1 to about 0.5 p. s. i.

References Cited in the file of this patent

UNITED STATES PATENTS

| | | |
|---|---|---|
| 2,378,439 | Schlesman | June 19, 1945 |
| 2,405,838 | Lawson et al. | Aug. 13, 1946 |
| 2,429,965 | Shearer et al. | Oct. 28, 1947 |
| 2,432,317 | Lawson et al. | Dec. 9, 1947 |
| 2,626,709 | Krieble | Jan. 27, 1953 |
| 2,711,828 | Webb et al. | June 28, 1955 |
| 2,760,850 | Lambert et al. | Aug. 28, 1956 |